May 26, 1925.                                                1,539,450
W. WILKINSON
METHOD OF SEPARATING THE CONSTITUENTS OF GASEOUS MIXTURES
Filed Oct. 16, 1920
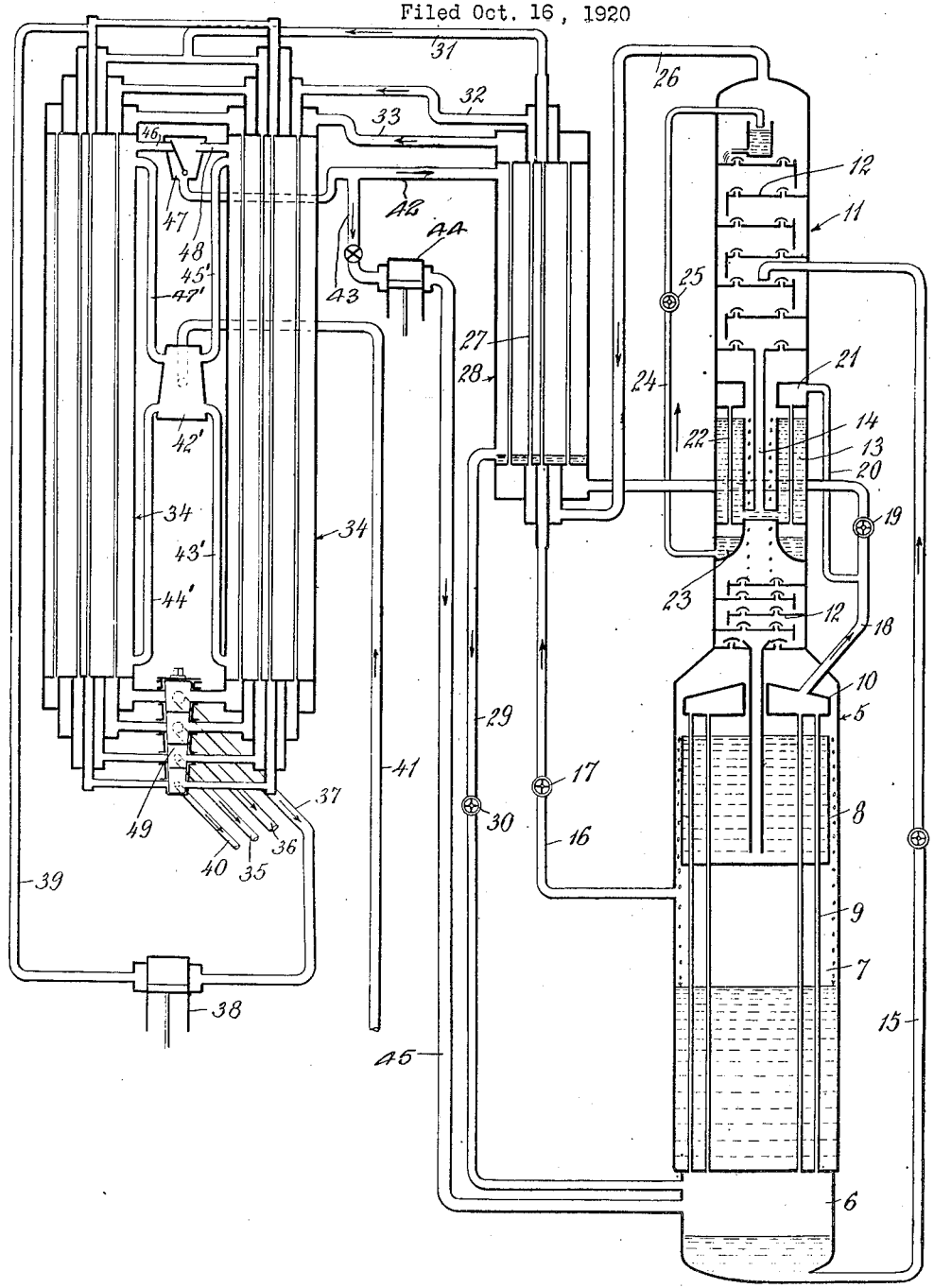
Inventor
Walter Wilkinson
By his Attorneys
Pennie Davis Marvin & Edmonds Patented May 26, 1925.

1,539,450

UNITED STATES PATENT OFFICE.

WALTER WILKINSON, OF JERSEY CITY, NEW JERSEY, ASSIGNOR TO AIR REDUCTION COMPANY, INC., A CORPORATION OF NEW YORK.

METHOD OF SEPARATING THE CONSTITUENTS OF GASEOUS MIXTURES.

Application filed October 16, 1920. Serial No. 417,444.

*To all whom it may concern:*

Be known that I, WALTER WILKINSON, a citizen of the United States, residing at Jersey City, in the county of Hudson, State of New Jersey, have invented certain new and useful Improvements in Methods of Separating the Constituents of Gaseous Mixtures; and I do hereby declare the following to be a full, clear, and exact description of the invention, such as will enable others skilled in the art to which it appertains to make and use the same.

This invention relates to the separation of the constituents of gaseous mixtures by liquefaction and rectification and while the method and apparatus will be described herein with particular reference to the recovery of oxygen and nitrogen from air, it is to be understood that no limitation with respect to the application of the invention is thereby implied A well known method of separating the constituents of gaseous mixtures includes the compression and cooling of the mixture, the liquefaction at the initial pressure of a portion of the mixture by heat interchange with cold products of the separation, the expansion of another portion with external work, the liquefaction in two fractions of the expanded mixture, with backward return of the liquid forming the first fraction and the rectification of the liquids with vapors arising from preceding portions thereof. The second fraction of the expanded mixture, which consists substantially of the more volatile constituent, is delivered to the rectifier at a level somewhat higher than the level at which the liquid constituting the first fraction is introduced together with the product of liquefaction at the initial pressure. The liquid of the second fraction is expected to wash the vapors to remove the less volatile constituent therefrom and thus to permit the efficient and maximum recovery of the latter constituent.

The method described has been in successful commercial use for a considerable period and is capable of producing either constituent of the mixture in substantial purity but it has long been known that both constituents could not be thus recovered and that in normal operations, a rather large proportion of the constituent desired contaminates the effluent or waste gas. This condition represents a considerable loss of efficiency and renders the method less available for otherwise practical applications of wide commercial value.

It is the object of the present invention to improve the method described and the apparatus employed therein and to provide a method of and apparatus for efficiently separating the constituents of gaseous mixtures by liquefaction.

Further objects and advantages of the invention will be apparent as it is better understood by reference to the following specification and accompanying drawing, in which an apparatus adapted for use in carrying out the method is digrammatically illustrated. No attempt has been made to illustrate constructional details of the apparatus and thereby obscure the purpose of the drawing and it is to be understood that such details may be varied within the knowledge of those skilled in the art.

The method hereinbefore described is used most widely in the separation of oxygen and nitrogen from the atmosphere and in referring to air for the better understanding of the method, the rare elements present therein are disregarded. Air as drawn into the apparatus contains substantially mixed proportions of nitrogen and oxygen. The liquid constituting the first fraction hereinbefore referred to, together with the air liquefied at the initial pressure as delivered to the rectifier has a composition approaching 47% oxygen, while the liquid constituting the second fraction is, as noted, substantially pure nitrogen and represents upward to 55% of the air treated. This relatively large volume of liquid nitrogen flows downwardly over the upper trays of the rectifier in contact with the vapors arising therethrough.

To insure proper rectification and the production of substantially pure oxygen, the liquid descending to the level at which the first fraction enters the rectifier must have a composition at that level approximating that of the first fraction. Any preponderance of nitrogen in the composition of the descending liquid at this level over that of the liquid then entering will result in contaminating the accumulating liquid oxygen with nitrogen which renders the oxygen worthless for ordinary commercial purposes. But the volume of nitrogen entering at the upper level is ordinarily excessive. The proportion of liquid nitrogen entering the top of the rectifier can be changed at will and the quantity of nitrogen can even be reduced to such an amount as would be proper for perfect rectification; but this regulation is accomplished only at the expense of the liquid constituting the first fraction which is thus enriched in nitrogen to an undesirable extent, so that it becomes difficult to secure a satisfactory separation. To convert the nitrogen into a liquid of the proper composition at the lower level, a greater amount of oxygen than would otherwise be required is usually vaporized and forced into the upper levels. However, it is impracticable to regulate the amount of oxygen evaporated to a nicety and consequently in practice an excess of oxygen is evaporated with the result that upward to 30% of the air treated escapes unseparated and represents a total waste of the energy consumed in raising it to its initial pressure in addition to other losses. The foregoing relates to the production of oxygen. If nitrogen is desired, the opposite course is pursued, the evaporation of oxygen being reduced to a point which permits a considerable quantity of nitrogen to descend with the liquid and contaminate the oxygen.

It is proposed to overcome the difficulty met and hereinbefore described by withdrawing the residual gas following the production of the first liquid fraction and liquefying such portion only thereof, as is requisite to the proper rectification of the first fraction. The liquid portion of the residual gas is thus delivered to the upper level of the rectifier in the amount desired to produce a liquid equivalent in composition to that entering at the lower level, and the regulation is readily accomplished by the simple manipulation of a valve controlling the flow of nitrogen through the liquefier as against the practical impossibility of regulating the rate of evaporation of the oxygen with any degree of accuracy. Furthermore, the quantity of liquid nitrogen entering the upper part of the rectifier can be varied without affecting the composition of the liquid entering the lower level. Thus, if the rate of evaporation of the oxygen increases, the effect is immediately checked by turning the valve which permits more nitrogen to enter the rectifier as a liquid, whereas if the rate of evaporation of oxygen decreases, the effect is likewise checked by decreasing the amount of nitrogen supplied to the rectifier. The result of such manipulation is almost instantaneous and consequently the operation can be readily balanced and both oxygen and nitrogen may be produced in a substantially pure condition, a result which has been heretofore impossible with the closest attention to operaton.

The balance of the nitrogen escaping at a substantial pressure, may be utilized, after it has given up its cold to incoming air, for the recovery of a portion of the energy originally consumed in compressing the air. The cold produced by this expansion may be utilized in the exchangers in cooling the incoming air. As the volume of nitrogen thus escaping is quite considerable, the energy recovered is an important factor in the economic operation of the method which is another advantage of the invention.

Referring to the drawing, a column 5 is illustrated as comprising a pot 6, a vaporizing compartment 7 having a liquid receptacle 8, both the compartment and receptacle being traversed by tubes 9 which communicate with the pot 6 and with a head 10 arranged above the receptacle. An extension 11 of the column forms a rectifier having the usual trays 12 arranged in two groups above and below a liquid compartment 13 in which the liquid, descending from the upper group through a tube 14, accumulates. The liquid overflows from the compartment 13 to the lower group of trays.

Liquid is formed in the tubes 9 from the incoming gaseous mixture by heat interchange with the liquid held in the compartment 7 and receptacle 8 at a lower pressure, the latter liquid being thereby evaporated. The liquid formed in the tubes 9 returns to the pot 6 where it joins liquid produced in a liquefier as hereinafter described and the mixed liquids are delivered through a pipe 15 controlled by a pressure reducing valve to the rectifier 11 at an intermediate level. Vapor produced in the compartment 7 is withdrawn through a pipe 16 controlled by a valve 17 and if air is being treated, is substantially pure oxygen. Vapor from the receptacle 8 and any excess of vapor in the compartment 7 rises around the head 10 and passes upwardly through the rectifier in contact with the downwardly flowing liquid.

The residual unliquefied gas which, if air is being treated, is substantially pure nitrogen, enters the head 10 from the tubes 9 and is withdrawn therefrom through a pipe 18 controlled by a valve 19. A portion of the gas is diverted from the pipe 18 through a pipe 20 to a head 21 above the compartment 13 and passes thence through tubes 22 immersed in the liquid held in the compartment to a receiver 23 for liquid. The receiver 23 is connected by a pipe 24, controlled by a valve 25, the upper level of the rectifier and the liquid formed in the tubes 22 by the heat interchange between the gas at a higher and the liquid at a lower pressure, is thereby delivered to the rectifier.

The amount of the more volatile constituent, for example nitrogen, which is liquefied in the tubes 22 and delivered to the upper level of the rectifier may be exactly regulated by manipulation of the valve 25. Consequently the correct amount of nitrogen to insure proper rectification of the liquid delivered through the pipe 15 may be supplied and the amount may be varied to compensate for changes in the composition of the liquid and rate of evaporation of the oxygen. Furthermore, the regulation accomplished by manipulation of the valve 25 does not affect the composition of the liquid deposited in the pot 6, a result which always follows any attempt to change the amount of the more volatile constituents delivered to the rectifier in carrying out the method as heretofore known. The result of the rectification is a liquid consisting of substantially pure oxygen accumulating in the compartment 7 and an effluent vapor which is substantially pure nitrogen which escapes through a pipe 26 at the top of the rectifier.

The nitrogen and oxygen escaping through the pipes 18 and 26 and 16 is at low temperature adapted to cause the liquefaction of the incoming air at higher pressures. The gases are, therefore, conveyed through separate sets of tubes 27 in a liquefier 28 through which a portion of the incoming air is caused to pass. The air is at its initial pressure and the liquid formed therefrom is delivered through a pipe 29 having a pressure reducing valve 30 to the pot 6 where it mixes with the liquid produced in the tubes 9 as hereinbefore described.

The gases, still cold, are conveyed from the liquefier through pipes 31, 32 and 33 to the exchangers 34, two of which are preferably provided and connected interchangeably to permit thawing of ice which forms therein from the water vapor carried by the incoming air. The gases pass through separate sets of tubes in the exchangers and are delivered through pipes 35, 36 and 37 at substantially atmospheric temperature. Oxygen and nitrogen escape through the pipes 35 and 36 respectively at substantially atmospheric pressure and nitrogen escapes through the pipe 37 at a somewhat higher pressure.

The nitrogen from the pipe 37 is capable of expansion for the recovery of energy and the production of low temperatures and is accordingly conveyed to an expansion engine 38 from which it is delivered at substantially atmospheric pressure and at a reduced temperature through a pipe 39, to the exchangers. After passing through a set of tubes in the exchanger, the expanded nitrogen is delivered through a pipe 40 at substantially atmospheric pressure and may be utilized for any desired purpose with the other gases recovered.

The incoming air compressed and cooled in suitable intercoolers and aftercoolers (not shown) is delivered through a pipe 41 to the exchangers and, after circulating therein about the tubes in indirect contact with the colder gases is delivered to a pipe 42 which is connected to the liquefier 28. A branch pipe 43 delivers a portion of the compressed and cold air to an engine 44 where it is expanded with external work and thereby cooled. The cold air passes thence through a pipe 45 to the pot 6 for subsequent liquefaction and rectification as hereinbefore described.

To permit alternate use of the exchangers for the purpose described the pipe 41 communicates with a valve chamber 42' from which the air may be diverted through pipes 43' or 44' to either of the exchangers. After passing through the right hand exchanger, for example, the air returns to the valve chamber 42' through a pipe 45' and passes thence through the pipe 44' to the other exchanger. The air finally escapes through a pipe 46 to a valve chamber 47 with which the pipe 42 is connected. Pipes 47' and 48 correspond to the pipes 45' and 46 and the valves in the valve chambers 42' and 47 may be operated to direct the air through the exchangers in alternate succession. A valve 49 controls the passage of gases through the tubes of the respective exchangers either being connected to the outlet pipes 35, 36, 37 and 40 as desired. When moisture is frozen in one of the exchangers the warm incoming air is directed first therethrough while the cold gases are supplied to the tubes of the other exchanger until the ice is melted. The water may be withdrawn through usual purging means provided for this purpose.

From the foregoing it will be apparent that an improved method of and apparatus for separating the constituents of gaseous mixtures is presented herein and that the improvements result in a marked advantage in the economic recovery of gases from mixtures thereof. In the operation of the method heretofore in use a single product is recovered, the remainder being waste gas of slight commercial value. By the operation of the improved method two commercially pure gases are recovered, such as oxygen and nitrogen. A portion of the energy consumed in compressing the gaseous mixture is recovered and the entire operation is facilitated and more easily controlled so that a uniform product is assured.

Various changes may be made in the details of the method as hereinbefore described without departing from the invention or sacrificing the advantages thereof.

I claim:

1. A method of separating the constituents of a gaseous mixture by liquefaction, which comprises compressing and cooling the mixture, liquefying a portion thereof at the initial pressure, expanding another portion, subjecting the expanded portion to selective liquefaction by indirect contact with colder products, thereby forming a liquid containing the constituents and a residual gas, subjecting the liquid to rectification with vapors of the preceding portions thereof, withdrawing and dividing the residual gas, liquefying non-selectively a regulated portion thereof and subjecting said vapors to final contact with the liquefied residual gas.

2. A method of separating the constituents of gaseous mixtures by liquefaction, which comprises compressing and cooling the mixture, liquefying a portion thereof at the initial pressure, expanding another portion, subjecting the expanded portion to selective liquefaction by indirect contact with colder products, thereby producing a liquid containing the constituents and a residual gas, subjecting the liquid to rectification with vapors of preceding portions thereof, withdrawing and dividing the residual gas, liquefying non-selectively a liquid portion thereof, subjecting said vapors to final contact with the liquefied residual gas and utilizing the remaining portion of the residual gas for the recovery of energy therefrom.

3. The method of separating the constituents of gaseous mixtures by liquefaction, which comprises compressing and cooling the mixture, liquefying a portion thereof at the initial pressure, expanding another portion, subjecting the expanded portion to selective liquefaction by indirect contact with colder products, thereby producing a liquid containing the constituents and a residual gas, subjecting the liquid to rectification with preceding portions thereof, withdrawing and dividing the residual gas at the initial pressure, liquefying non-selectively a regulated portion thereof by indirect contact with liquid undergoing rectification, and subjecting said vapors to final contact with the liquefied residual gas.

4. The method of separating the constituents of gaseous mixtures by liquefaction, which comprises compressing and cooling the mixture, liquefying a portion thereof at the initial pressure, expanding another portion, subjecting the expanded portion to selective liquefaction by indirect contact with colder products, thereby producing a liquid containing the constituents and a residual gas, subjecting the liquid to rectification with preceding portions thereof, withdrawing and dividing the residual gas at the initial pressure, liquefying non-selectively a regulated portion thereof by indirect contact with liquids undergoing rectification, subjecting said vapors to final contact with the liquefied residual gas, subjecting the remaining portion of the residual gas to heat interchange with the incoming mixture and expanding it to recover energy therefrom.

5. A method of separating the constituents of gaseous mixtures by liquefaction, which comprises compressing and cooling the mixture, liquefying a portion thereof at the initial pressure, expanding another portion, subjecting the expanded portion to selective liquefaction by indirect contact with colder products, thereby producing a liquid containing the constituents and a residual gas, liquefying non-selectively a portion of the residual gas, subjecting the two liquids to rectification with vapors from the preceding portions thereof, and regulating the supply of liquefied residual gas to reduce the amount of the more readily condensable constituent escaping with the vapor.

6. A method of separating the constituents of gaseous mixtures by liquefaction, which comprises compressing and cooling the mixture, liquefying a portion thereof at the initial pressure, expanding another portion, subjecting the expanded portion to selective liquefaction by indirect contact with colder products, thereby producing a liquid containing the constituents and a residual gas, liquefying non-selectively a portion of the residual gas, subjecting the two liquids to rectification with vapors from the preceding portions thereof, regulating the supply of liquefied residual gas to reduce the amount of the more readily condensable constituent escaping with the vapor, and utilizing the remaining portion of the residual gas for the recovery of energy therefrom.

7. A method of separating the constituents of gaseous mixtures by liquefaction, which comprises compressing and cooling the mixture, liquefying a portion thereof at the initial pressure, expanding another portion, subjecting the expanded portion to a liquefaction operation to separate it into a liquid fraction and a residual gaseous fraction, withdrawing and dividing the gaseous fraction, liquefying non-selectively a regulated portion of the gaseous fraction, rectifying the liquid fraction and employing the liquefied gaseous fraction to reduce the proportion of the more condensable constituent escaping from the vapor from the liquid fraction.

In testimony whereof I affix my signature.

WALTER WILKINSON.